United States Patent [19]

Sano

[11] Patent Number: 5,126,854
[45] Date of Patent: Jun. 30, 1992

[54] PHASE LOCK CIRCUIT FOR GENERATING A PHASE SYNCHED SYNCHRONIZING VIDEO SIGNAL

[75] Inventor: Shoichi Sano, Yokosuka, Japan

[73] Assignee: Fujitsu Limited, Kawasaki, Japan

[21] Appl. No.: 426,041

[22] Filed: Oct. 24, 1989

[30] Foreign Application Priority Data

Oct. 27, 1988 [JP] Japan .................. 63-271318

[51] Int. Cl.⁵ .............................................. H04N 5/93
[52] U.S. Cl. ...................... 358/342; 358/319; 358/337; 360/37.1
[58] Field of Search ................. 358/17, 149, 150, 153, 358/158, 185, 319, 320, 337, 342; 360/10.1, 36.1, 37.1; 369/54

[56] References Cited

U.S. PATENT DOCUMENTS

| | | | |
|---|---|---|---|
| 4,420,775 | 12/1983 | Yamazaki et al. | 360/37.1 X |
| 4,542,351 | 9/1985 | Okada | 360/37.1 X |
| 4,613,827 | 9/1986 | Takamori et al. | 358/319 X |
| 4,616,259 | 10/1986 | Moran et al. | 358/150 X |
| 4,646,103 | 2/1987 | Sugiyama et al. | 369/54 X |
| 4,760,468 | 7/1988 | Nakano et al. | 358/320 X |

FOREIGN PATENT DOCUMENTS

63-174497 7/1988 Japan .

Primary Examiner—Roy N. Envall, Jr.
Assistant Examiner—W. R. Young
Attorney, Agent, or Firm—Staas & Halsey

[57] ABSTRACT

A phase lock circuit includes a control signal generator which generates a control signal changing for every frame consisting of an odd-numbered field and an even-numbered field in a reproduction mode. The control signal has a first level for a frame and a second level for a subsequent frame. The phase lock circuit further includes a first PLL circuit and a second PLL circuit. The first PLL circuit generates a first synchronizing signal which is phase-locked with a reproduced synchronizing signal for every other frame when the control signal is at the first level. The second PLL circuit generates a second synchronizing signal which is phase-locked with the reproduced synchronizing signal for every other frame when the control signal is at the second level. Furthermore, the phase lock circuit includes a select circuit which selects one of the first and second synchronizing signals supplied from the first and second PLL circuits on the basis of the control signal. The selected synchronizing signal is the synchronizing signal output from the phase lock circuit.

10 Claims, 6 Drawing Sheets

PRIOR ART

PHASE LOCK CIRCUIT FOR GENERATING A PHASE SYNCHED SYNCHRONIZING VIDEO SIGNAL

BACKGROUND OF THE INVENTION

The present invention generally relates to a phase lock circuit for a video signal. The present invention is more particularly directed to a circuit which generates a horizontal synchronizing signal in phase with a horizontal synchronizing signal reproduced from a laser video disc player.

A system including a laser video disc player and a personal computer mutually connected is known. In such a system, a video signal reproduced from the laser video disc player is supplied to a display device together with a video signal supplied from the personal computer. Generally, the video signal to be displayed is transmitted to the personal computer through a public telephone line.

A video signal used in a television set is defined by the IEA RS-170A standard, for example. According to the standard, one period of the video signal consists of four fields. A color frame is formed by one period of the video signal. On the other hand, a conventional laser video disc player has a still reproduction mode in which the video signal is reproduced for every two fields. In the still reproduction mode, as will be described in detail later, there is a large difference in phase between a horizontal synchronizing signal reproduced from the laser video disc player and a corresponding signal generated from a system clock of a phase locked loop for every two fields. Thus, it takes a long time to pull the horizontal synchronizing signal derived from the system clock phase into phase with the reproduced horizontal synchronizing signal. The difference in phase deteriorates a reproduced image in the horizontal direction of picture. Therefore, it is required to reduce the phase difference to zero rapidly and thereby stabilize images on the display.

SUMMARY OF THE INVENTION

Accordingly, a general object of the present invention is to provide a phase lock circuit for a video signal in which the aforementioned disadvantages are eliminated.

A more specific object of the present invention is to provide a phase lock circuit for a video signal capable of pulling the horizontal synchronizing signal from the system clock of the phase locked loop into phase with the horizontal synchronizing signal reproduced from a laser video disc player.

The above objects of the present invention can be achieved by a phase lock circuit generating a synchronizing signal in phase with a synchronizing signal reproduced from a video disc player, the video disc player having a reproduction mode in which the reproduced synchronizing signal is repeatedly generated for every frame composed of an odd-numbered field and an even-numbered field. The phase lock circuit comprises means for generating a control signal, the control signal having a first level for a frame and a second level for a subsequent frame, the level of the control means, coupled to the means for generating a control signal, for generating a first synchronizing signal which is pulled in phase with the reproduced synchronizing signal for every other frame when the control signal is at the first level, second phase locked loop means, coupled tot he means for generating a control signal, for generating a second synchronizing signal which is pulled in phase with the reproduced synchronizing signal for every other frame when the control signal is at the second level, and selecting means, coupled to the means for generating a control signal and the first and second phase locked loop means, for selecting one of the first and second synchronizing signals supplied from the first and second phase locked loop means on the basis of the control signal. The selected synchronizing signal is the synchronizing signal output from the phase lock circuit.

Additional objects, features and advantages of the present invention will become apparent from the following detailed description when read in conjunction with the accompanying drawings.

DESCRIPTION OF THE PREFERRED EMBODIMENTS

Figure 1:
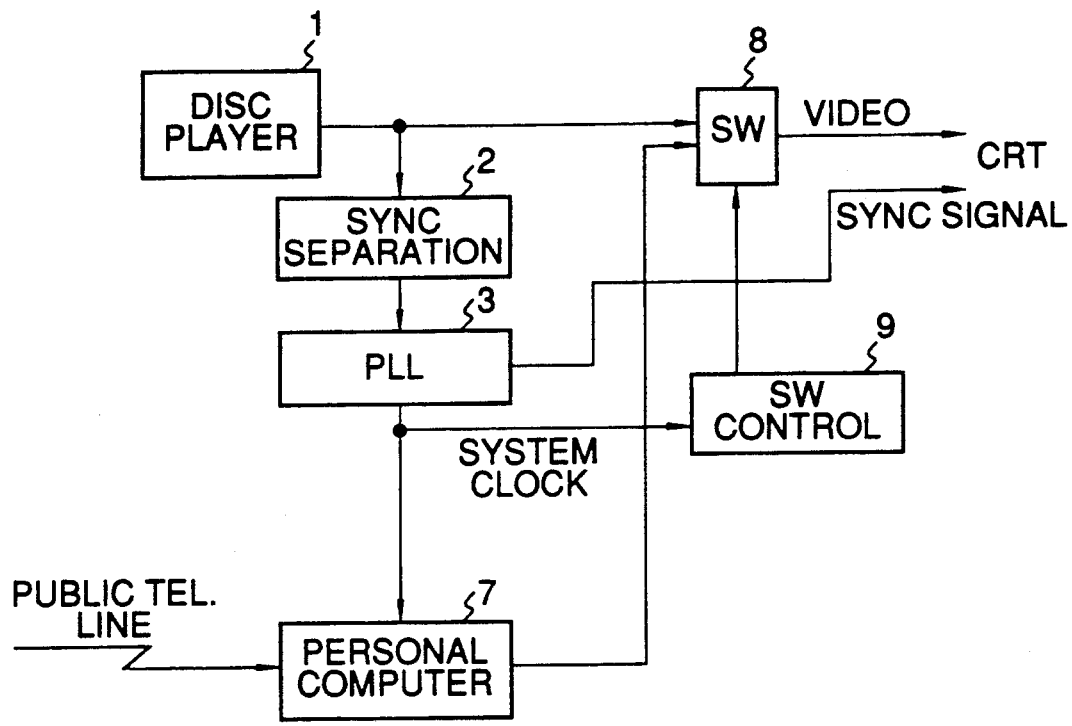
FIG.1 is a block diagram of a system including a laser video disc player and a personal computer.
Figure 2:
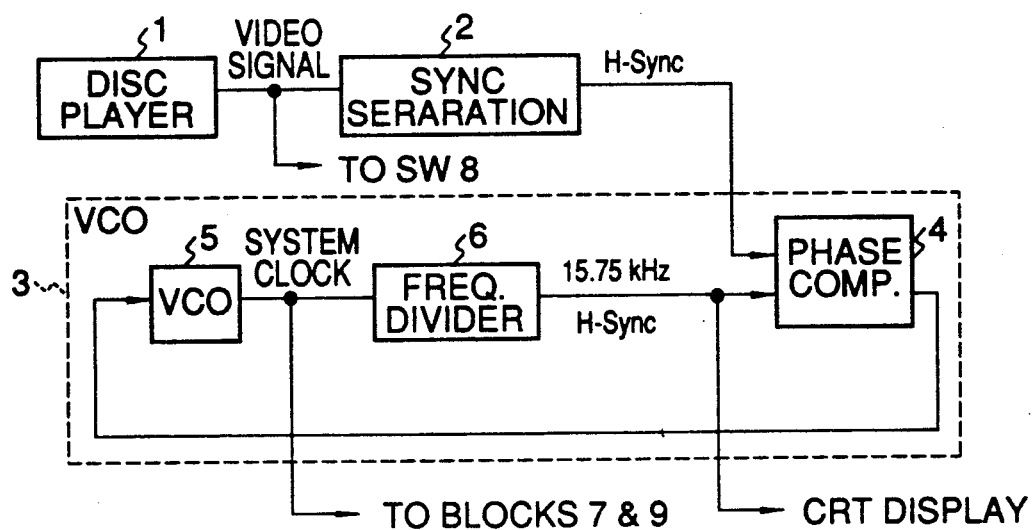
FIG.2 is a block diagram of a conventional phase lock circuit.

A description is given of a conventional circuit with reference to FIGS.1 and 2 in order to facilitate understanding the present invention.

Referring to FIG.1, there is illustrated a system which includes a laser video disc player 1 and a personal computer 7. A horizontal synchronizing signal is separated from a video signal reproduced from the laser video disc player 1 by a synchronous separation circuit 2. The separated horizontal synchronizing signal is supplied to a phase locked loop circuit 3 (hereinafter simply referred to as a PLL circuit 3), and the remaining video signal is supplied to a switch 8. The PLL circuit 3 generates a horizontal synchronizing signal in synchronism with the extracted horizontal synchronizing signal. The generated horizontal synchronizing signal is supplied to a CRT display device (not shown). The PLL circuit 3 also generates a system clock having a frequency higher than that of the horizontal synchronizing signal. The horizontal synchronizing signal derived from the PLL circuit 3 is formed by frequency-dividing the system clock in the PLL circuit 3. The system clock is supplied to a personal computer 7 and a switch controller 9. The personal computer 7 generates characters or graphics, which are set therein through a public telephone line, for example. The video signal from the personal computer 7 is supplied to the switch 8. The switch controller 9, which operates in synchronism with the system clock from the PLL circuit 3, controls the switch 8 so as to select either the video signal from the laser video disc player 1 or the video signal from the personal computer 7. The selected video signal is supplied to the CRT display device.

FIG.2 is a block diagram of the PLL circuit 3. As is shown, the PLL circuit 3 is made up of a voltage controlled oscillator (VCO) 5, a frequency divider 6 and a phase comparator 4. The horizontal synchronizing signal (15.75kHz) supplied from the synchronous separation circuit 2 is applied to the phase comparator 4. The VCO 5 generates the aforementioned system clock, which is frequency-divided by the frequency divider 6 so that the aforementioned horizontal synchronizing signal is generated. The phase comparator 4 compares the phase of the reproduced horizontal synchronizing signal and the phase of the horizontal synchronizing signal supplied from the frequency divider 6. The phase comparator 4 outputs a phase difference error signal (voltage signal), by which the frequency of the VCO 5 is controlled so that the phase difference error signal becomes zero.

Figure 3:
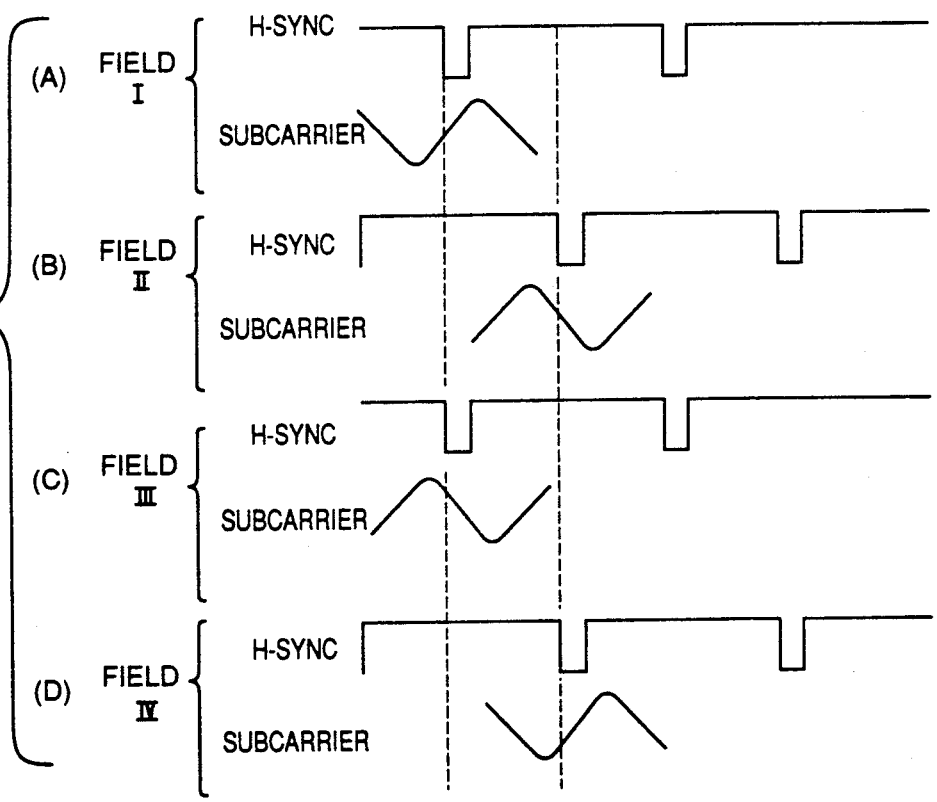
FIGS. 3(A)–3(D) are waveform diagrams is a waveform diagram of signals in a normal reproduction mode.

FIG.3 is a timing chart of the video signal defined in the aforementioned EIA RS-170A standard. The horizontal synchronizing signal H-sync has a phase difference equal to a ½ period between an odd-numbered field and an even-numbered field. The odd-numbered fields have the same phase, and even-numbered fields have the same phase. A color subcarrier signal has predetermined phase differences with respect to the horizontal synchronizing signal H-sync in the four fields I-IV. The phase differences are different from each other in the fields I-IV. The horizontal synchronizing signal H-sync and the color subcarrier signal are predetermined so as to have timing relationship shown in FIG.3. The color subcarrier signal is used as a reference signal for use in synchronous detection for reproducing color signals. The aforementioned color frame has one period which consists of the four fields I-IV (FIGS. 3(A)-(D)).

In a normal reproduction mode, the laser video disc player I reproduces a video signal having one period consisting of the four fields I-IV. In the normal reproduction mode, the system clock in synchronism with the reproduced horizontal synchronizing signal H-sync is generated by the PLL circuit 3.

Figure 4:
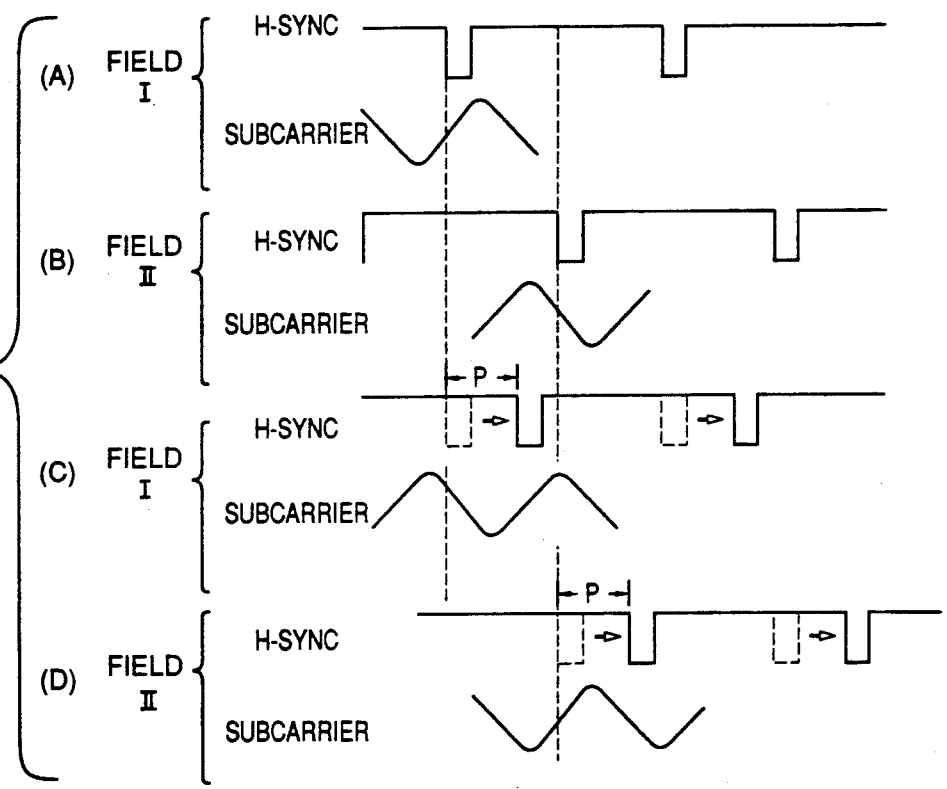
FIGS.4(A)–4(D) are waveform diagrams a waveform diagram of signals in a still reproduction mode.

On the other hand, the laser video disc player 1 has the aforementioned still reproduction mode. In the still reproduction mode, generally, only the first and second fields I and II or only the third and fourth fields III and IV are repeatedly output from the laser video disc player 1. For example, as shown in FIG.4, the first field I (FIG.4(A)) and the second field II (FIG.4(B)) are reproduced. After that, the first and second fields I and II are reproduced instead of reproducing the third and fourth fields III (FIG.4(C)) and IV (FIG.4(D)). That is, in the still reproduction mode, the third and fourth fields are not reproduced. In case where the color subcarrier signal does not have the aforementioned phase relationship with respect to the horizontal synchronizing signal H-sync, color distortion may occur. For this reason, it is required that in the still reproduction mode the color subcarrier signal be output as in the case of the normal reproduction mode. A conventional laser video disc player includes a specific circuit for shifting the horizontal synchronizing signal H-sync by a ½ wavelength with respect to the color subcarrier signal.

As described above, in the still reproduction mode, the phase of the horizontal synchronizing signal deviates from the original phase thereof for every two fields. As is illustrated in FIGS.4(C) and 4(D), the horizontal synchronizing signal H-sync appears at positions represented by dotted lines in the normal reproduction mode, while in actuality it appears at positions represented by solid lines in the still reproduction mode. Thus, the output signal of the phase comparator 4, or the phase difference error signal changes greatly and it takes very long to pull the horizontal synchronizing signal derived from system clock in phase with the reproduced horizontal synchronizing signal. During this time, the horizontal synchronizing signal derived from the system clock greatly deviates from the reproduced horizontal synchronizing signal, and an image distortion occurs in the horizontal direction on the CRT display.

Conventionally, a high response speed VCO is used in order to cope with the above-mentioned problem. That is, since a deviation equal to period P appears immediately after the vertical synchronizing signal, correction by the high response speed VCO is made during a vertical blanking period.

However, a high response speed VCO is very sensitive to a change of voltage. Therefore, the circuit having a high response speed VCO is greatly influenced by external disturbance such as noise and may frequently malfunction.

Figure 5:
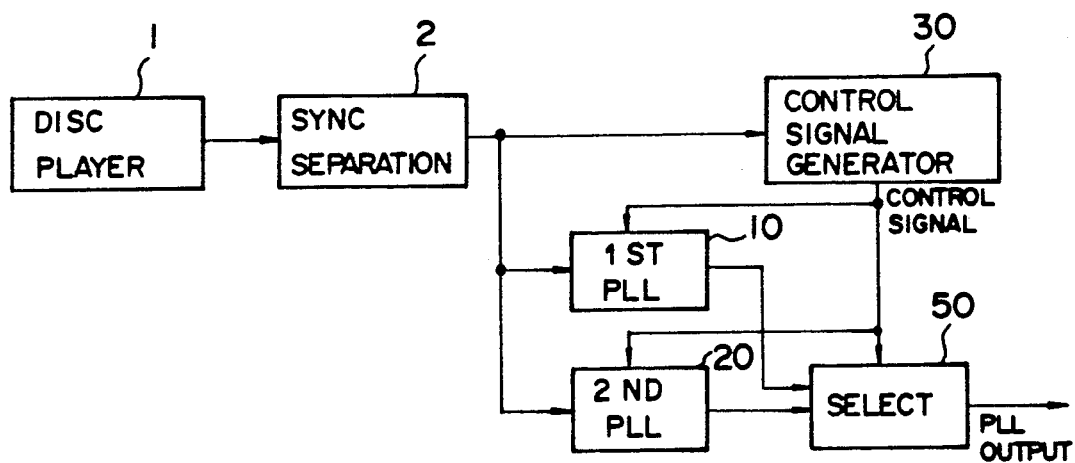
FIG.5 is a block diagram of a preferred embodiment of the present invention.

A description is given of an embodiment of the present invention with reference to FIG.5. Referring to FIG.5, the laser video disc player 1 has the aforementioned normal reproduction mode and still reproduction model. That is, the laser video disc player 1 outputs the video signal (FIG.3) having one period consisting of the first to fourth fields I-IV, and reproduces the video signal (FIG.4) having one period consisting of the first and second fields I and II. A control signal generator 30 is coupled to the laser video disc player 1 through the synchronous separation circuit 2. That is, the control signal generator 30 is supplied with the reproduced horizontal synchronizing signal separated from the reproduced video signal from the laser video disc player 1. The control signal generator 30 generates a control signal, the level of which changes for every frame consisting of the first (odd-numbered) field I and the second (even-numbered) field II. A first PLL circuit 10 performs a dynamic phase control for every other frame indicated by the control signal from the control signal generator 30, and pulls the horizontal synchronizing signal derived from the system clock generated therein in phase with the reproduced horizontal synchronizing signal. In the dynamic phase control, the horizontal synchronizing signal derived therefrom is always controlled so as to be pulled in phase with the reproduced horizontal synchronizing signal being supplied from the synchronous separation circuit 2. A second PLL circuit 20 performs the dynamic phase control for every other frame indicated by the control signal from the control signal generator 30. When the first PLL circuit 10 performs the dynamic phase control, the second PLL circuit 20 performs a static phase control. In the static phase control, the phase of the horizontal synchronizing signal derived from the second PLL circuit 20 is fixed to the phase of the reproduced horizontal synchronizing signal held in the second PLL circuit 20. On the other hand, when the second PLL circuit 20 performs the dynamic phase control, the first PLL circuit 10 performs the static phase control. In the static phase control, the phase of the horizontal synchronizing signal derived from the first PLL circuit 10 is fixed to the phase of the reproduced- horizontal synchronizing signal held in the first PLL circuit 10. Thus, the horizontal synchronizing signal derived from the system clock in the first PLL circuit 10 is pulled in phase with the reproduced horizontal synchronizing signal during a frame, and the horizontal synchronizing signal derived from the system clock in the second PLL circuit 20 is pulled in phase with the reproduced horizontal synchronizing signal for the subsequent frame. This synchronizing procedure is repeatedly carried out. A select circuit 50 selects one of the two generated horizontal synchronizing signals supplied from the first and second PLL circuits 10 and 20. When the first PLL circuit 10 dynamically performs the phase control, the select circuit 50 selects the first PLL circuit 10. On the other hand, when the second PLL circuit 20 dynamically carries out the phase control, the select circuit 50 selects the second PLL circuit 20.

Figure 6:
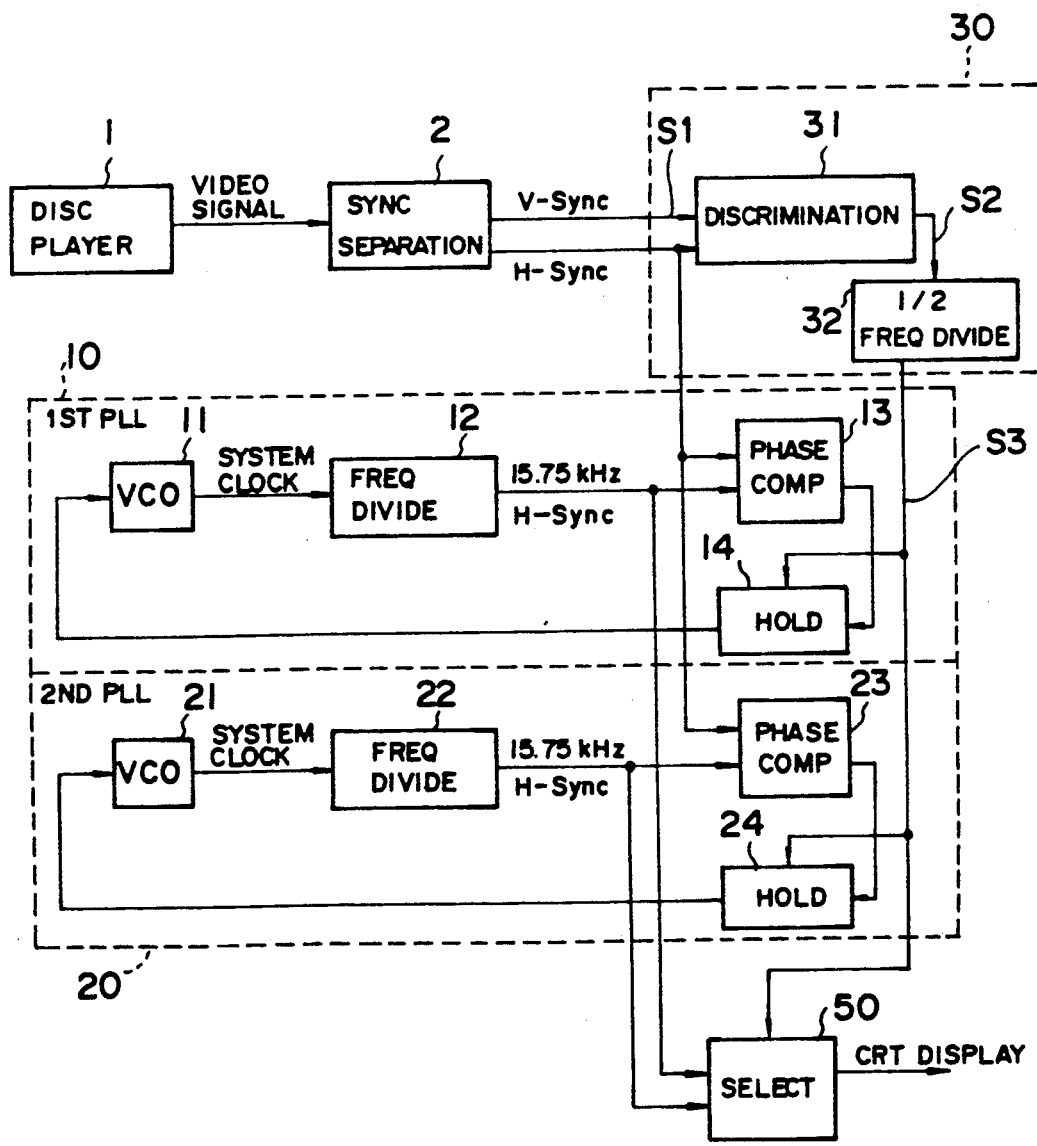
FIG.6 is a block diagram of the detailed structure of the configuration shown in FIG. 5.

FIG.6 is a block diagram of the detailed structure of the configuration shown in FIG.5. In FIG.6, those parts which are the same as those in FIG.5 are given the same reference numerals. The first PLL circuit 10 is made up of a voltage controlled oscillator (VCO) 11, a frequency divider 12, a phase comparator 13 and a hold circuit 14. The VCO 11 generates a system clock of a frequency equal to 23MHz, for example. The frequency divider 12 frequency-divides the system clock and outputs a horizontal synchronizing signal of a frequency equal to 15.75kHz. The phase comparator 13 compares the horizontal synchronizing signal from the frequency divider 12 with the reproduced horizontal synchronizing signal from the synchronous separation circuit 2. The hold circuit 14 holds or passes the output signal of the phase comparator 13. The output signal of the hold circuit 14 is supplied to the VCO 11.

The second PLL circuit 20 is made up of a voltage controlled oscillator (VCO) 21, a frequency divider 22, a phase comparator 23 and a hold circuit 24. The VCO 21 generates a system clock of a frequency equal to 23MHz, for example. The frequency divider 22 frequency-divides the system clock and outputs a horizontal synchronizing signal of a frequency equal to 15.75kHz. The phase comparator 23 compares the horizontal synchronizing signal from the frequency divider 22 with the reproduced horizontal synchronizing signal from the synchronous separation circuit 2. The hold circuit 24 holds or passes the output signal of the phase comparator 23. The output signal of the hold circuit 24 is supplied to the VCO 21.

The control signal generator 30 is made up of a discrimination circuit 31 and a ½ frequency divider 32. The discrimination circuit 31 discriminates an even-numbered field from an odd-numbered field, and outputs a decision signal having a high (H) level for odd-numbered field and a low (L) level for even-numbered field. The ½ frequency divider 32 frequency-divides the decision signal from the discrimination circuit 31 to thereby generate the aforementioned control signal. The control signal thus formed is supplied to the hold circuits 14 and 24. When the control signal is at a low level, the hold circuit 14 passes the phase comparison error signal, for example. On the other hand, when the control signal is at a high level, the hold circuit 24 passes the phase comparison error signal. Further, the control signal supplied from the ½ frequency divider 32 is supplied to the select circuit 50. The select circuit 50 selects one of the horizontal synchronizing signals from the first and second PLL circuits 10 and 20 on the basis of level of the control signal.

Figure 7:
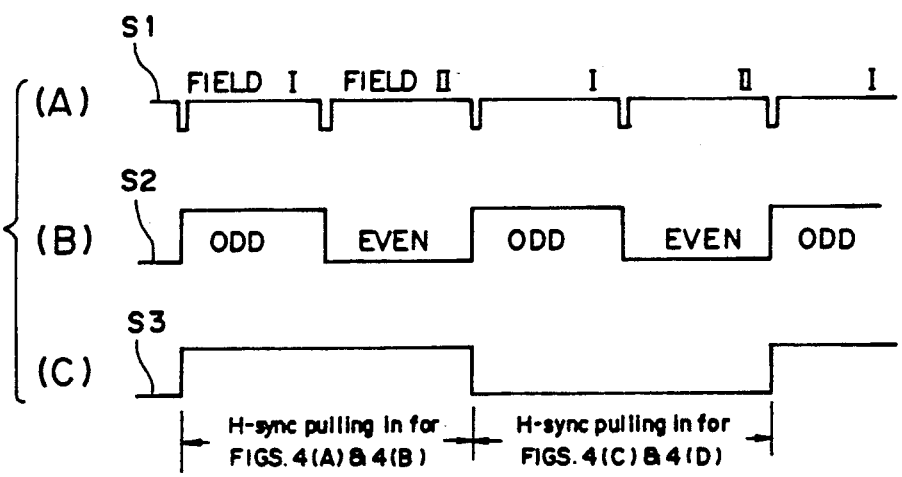
FIGS. 7(A)–7(C) are waveform diagrams waveform diagram of signals observed at parts of the configuration shown in FIG.6.

A description is given of an operation of the embodiment shown in FIG.6 with reference to FIG.7, which is a waveform diagram of signals at parts of the configuration shown in FIG.6. A vertical synchronizing signal and the horizontal synchronizing signal labeled S1 (FIG.7(A)) supplied from the synchronous separation circuit 2 are supplied to the discrimination circuit 31. The discrimination circuit 31 discriminates odd-numbered fields from even-numbered fields on the basis of the vertical and horizontal synchronizing signals in a conventional manner, and outputs the decision signal labeled S2 (FIG.7(B)) having H level for each odd-numbered field and L level for each even-numbered field. The decision signal S2 is 20 frequency-divided by the ½ frequency divider 32, which generates the control signal labeled S3 (FIG.7(C)) having H level during the first and second fields and having L level during the subsequent first and second fields.

In the still reproduction mode, the control signal S3 supplied from the ½ frequency divider is at H level during the first and second fields I and II shown in FIG.4 (with the same timing in the normal reproduction mode). In this state, the hold circuit 14 of the first PLL circuit 10 passes the phase comparison error signal supplied from the phase comparator 13 as it is. In other words, the hold circuit 14 does not hold the phase comparison error signal. On the other hand, the hold circuit 24 of the second PLL circuit 20 holds the phase comparison error signal supplied from the phase comparator 23. While the control signal S3 is at H level, the select circuit 50 selects the horizontal synchronizing signal from the frequency divider 12 of the first PLL circuit 10. The phase comparator 13 compares the phase of the horizontal synchronizing signal from the frequency divider 12 with the phase of the reproduced horizontal synchronizing signal from the synchronous separation circuit 2. The phase comparison error signal is fed back to the VCO 11, which changes the frequency on the basis of the received phase comparison error signal so that the horizontal synchronizing signal from the frequency divider 12 is pulled in phase with the reproduced horizontal synchronizing signal. The horizontal synchronizing signal from the frequency divider 12 is supplied to the CRT display device (not shown) through the select circuit 50.

During the subsequent first and second fields shown in FIGS.4(C) and 4(D) where the horizontal synchronizing signal H-sync is phase-shifted by period P, the control signal S3 supplied from the ½ frequency divider 32 is at L level. In this state, the hold circuit 24 of the second PLL circuit 20 passes the phase comparison error signal derived from the phase comparator 23 as it is, and on the other hand, the hold circuit 14 holds the phase comparison error signal from the phase comparator 13. Further, the select circuit 50 selects the horizontal synchronizing signal supplied from the frequency divider 22. The phase comparator 23 compares the phase of the horizontal synchronizing signal from the frequency divider 22 with the phase of the reproduced horizontal synchronizing signal from the synchronous separation circuit 2. The phase comparison error signal is fed back to the VCO 21 through the hold circuit 24. The VCO 21 controls the system clock so that the horizontal synchronizing signal from the frequency divider is pulled in phase with the reproduced horizontal synchronizing signal. During the first and second fields shown in FIGS.4(C) and 4(D), the hold circuit 14 of the first hold circuit 10 is outputting the held phase comparison error signal, which is the last output in the previous first and second fields. The VCO 11 executes the phase control on the basis of the held phase comparison error signal. That is, the horizontal synchronizing signal from the frequency divider 12 is pulled in phase with the reproduced horizontal synchronizing signal shown in FIGS.4(A) and 4(B).

The aforementioned operation is repeatedly carried out for every two fields. The first PLL circuit 10 outputs the horizontal synchronizing signal which is pulled in phase with the reproduced horizontal synchronizing signal shown in FIGS.4(A) and 4(B). The second PLL circuit 20 outputs the horizontal synchronizing signal which is pulled in phase with the reproduced horizontal synchronizing signal shown in FIGS.4(C) and 4(D). The output signals of the first and second PLL circuits 10 and 20 are alternatively supplied to the CRT display device through the select circuit 50. Thus, it becomes possible to carry out phase control rapidly in the still reproduction mode. As a result, the VCOs 11 and 12 can be formed by low response speed VCOs. It follows that the phase lock circuit of the present invention is immune to noise and does not malfunction due to noise.

The present invention is not limited to the aforementioned embodiments, and variations and modifications may be made without departing from the scope of the present invention.

What is claimed is:

1. A phase lock circuit for generating a synchronizing signal output which is phase with a synchronizing signal reproduced from a video disc player, said video disc player having a reproduction mode in which said reproduced synchronizing signal is generated for each frame comprising both an odd-numbered field and an even-numbered field, said phase lock circuit comprising:

control signal generating means for generating a control signal, said control signal having a first level for a first frame and a second level for a second frame, the first and second levels of said control signal changing for said first and second frames;

first phase locked loop means, coupled to said control signal generating means, for generating a first synchronizing signal which is phase-locked with said reproduced synchronizing signal for every other frame when said control signal is at said first level;

second phase locked loop means, coupled to said control signal generating means, for generating a second synchronizing signal which is phase-locked with said reproduced synchronizing signal for every other frame when said control signal is at said second level; and selecting means, coupled to said control signal generating means and said first and second phase locked loop means, for selecting one of said first and second synchronizing signals respectively generated by said first and second phase locked loop means on the basis f said control signal, the selected synchronizing signal being said synchronizing signal output of said phase lock circuit.

2. A phase lock circuit as claimed in claim 1, wherein said first phase locked loop means includes voltage controlled oscillator means for generating a system clock, frequency dividing means for frequency-dividing said system clock and thereby generating said first synchronizing signal, phase comparing means for comparing the phase of said first synchronizing signal with said reproduced synchronizing signal and thereby generating an error signal, and selective holding means for selectively passing said error signal supplied from said phase comparing means when said control signal is at said first level and for holding said error signal when said control signal is at said second level, said error signal supplied from said selective holding means being supplied to said voltage controlled oscillator means and said voltage controlled oscillator means being controlled by said error signal in generating said system clock.

3. A phase lock circuit as claimed in claim 2, wherein when said control signal is at said first level, said selecting means selects said first synchronizing signal.

4. A phase lock circuit as claimed in claim 2, wherein the frequency of said system clock is equal to 23MHz.

5. A phase lock circuit as claimed in claim 1, wherein said second phase locked loop means includes voltage controlled oscillator means for generating a system clock, frequency dividing means for frequency-dividing said system clock and thereby generating said second synchronizing signal, phase comparing means for comparing the phase of said second synchronizing signal with said reproduced synchronizing signal and thereby generating an error signal, and selective holding means for selectively passing said error signal supplied from said phase comparing means when said control signal is at said second level and for holding said error signal when said control signal is at said first level, said error signal supplied from said selective holding means being supplied to said voltage controlled oscillator means being controlled by said error signal in generating said system clock.

6. A phase lock circuit as claimed in claim 5, wherein when said control signal is at said second level, said selecting means selects said second synchronizing signal.

7. A phase lock circuit as claimed in claim 1, wherein said reproduced synchronizing signal includes a horizontal synchronizing signal and a vertical synchronizing signal, and said control signal generating means includes discriminating means for receiving said horizontal and vertical synchronizing signals, and in response thereto for discriminating said odd-numbered field of said reproduced synchronizing signal from said evennumbered field thereof and for generating a decision signal having a first decision level for said odd-numbered field and a second decision level for said even-numbered field, and frequency dividing means for dividing a first frequency of said decision signal into a signal having a second frequency equal to half the first frequency of said decision signal, and wherein said signal supplied from said frequency dividing means is supplied, as said control signal, to said first and second phase locked loop means and said selecting means.

8. A phase lock circuit as claimed in claim 1, wherein said synchronizing signal is a horizontal synchronizing signal.

9. A phase lock circuit as claimed in claim 1, wherein the frequency of said synchronizing signal is equal to 15.75kHz.

10. A phase lock circuit as claimed in claim 1, wherein said synchronizing signal is in conformity with the IEA RS-170A standard.

* * * * *

UNITED STATES PATENT AND TRADEMARK OFFICE
CERTIFICATE OF CORRECTION

PATENT NO. : 5,126,854
DATED : June 30, 1992
INVENTOR(S) : Shoichi Sano

It is certified that error appears in the above-identified patent and that said Letters Patent is hereby corrected as shown below:

column 7, line 26, change "which is phase" to --which is in phase--;
    column 7, line 53, change "f" to --of--.

Signed and Sealed this

Seventeenth Day of August, 1993

Attest:

BRUCE LEHMAN

Attesting Officer     Commissioner of Patents and Trademarks